(12) United States Patent
Sugawara

(10) Patent No.: US 8,094,442 B2
(45) Date of Patent: Jan. 10, 2012

(54) DISPLAY

(75) Inventor: Hideaki Sugawara, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 93 days.

(21) Appl. No.: 12/149,656

(22) Filed: May 6, 2008

(65) Prior Publication Data
US 2008/0285223 A1    Nov. 20, 2008

(30) Foreign Application Priority Data
May 17, 2007  (JP) ................................ 2007-131364

(51) Int. Cl.
H05K 5/00 (2006.01)
H05K 7/00 (2006.01)

(52) U.S. Cl. ......... 361/679.21; 361/679.22; 361/679.26; 349/58; 349/60

(58) Field of Classification Search ............ 361/679.21, 361/679.22, 679.26; 349/58, 60; 455/575.1; 345/104
See application file for complete search history.

(56) References Cited

U.S. PATENT DOCUMENTS
2006/0152471 A1*  7/2006  Sugawara .................... 345/104
2007/0070263 A1*  3/2007  Nishimura et al. ............ 349/58

FOREIGN PATENT DOCUMENTS
CN   1804693 A   7/2006
JP   8-241044     9/1996
JP   2006-195146  7/2006

OTHER PUBLICATIONS
Chinese Office Action dated Dec. 16, 2010 with English translation.

* cited by examiner

*Primary Examiner* — Anthony Haughton
(74) *Attorney, Agent, or Firm* — McGinn IP Law Group, PLLC

(57) ABSTRACT

A display includes: a display panel including a display surface; a frame including a cover part which partially faces the display surface; and a film whose fixing area is fixed to the cover part and which is arranged between the display surface and the cover part. The cover part includes a flat part and a stepped part which projects toward the display surface, and the film comes in contact with the display surface to be bent.

21 Claims, 12 Drawing Sheets

DISPLAY

INCORPORATION BY REFERENCE

This application is based upon and claims the benefit of priority from Japanese Patent Application No. 2007-131364, filed on May 17, 2007, the disclosure of which is incorporated herein in its entirety by reference.

BACKGROUND OF THE INVENTION

1. Technical Field

The present invention relates to a display, and in particular, to a display having a display panel, a frame, and a film arranged therebetween.

2. Background Art

A liquid crystal display (LCD) features thin and light body, and low power consumption. Therefore, an LCD is widely used in office automation equipment, audio visual equipment, a portable terminal device and the like. An LCD mainly includes a backlight, a liquid crystal panel in which a liquid crystal is sandwiched between a pair of substrates that face each other, a front frame and a rear frame which hold these members, and a case such as a chassis.

The LCD may include a buffer material in a gap between the liquid crystal panel and the front frame in order to prevent dust invasion and/or leakage of lights through the gap. The buffer material applies a load to the liquid crystal panel to cause display unevenness. Thus, a quality level of display is deteriorated. A patent document 1 (Japanese Patent Application Laid-Open No. 2006-195146) discloses a device which can achieve the prevention of dust invasion and light leakage to prevent display deterioration, as shown in FIG. 13 and FIG. 14.

In an LCD 1 shown in FIG. 13, a film 52 is bent and fixed on a rear face of a front frame 7 that faces a liquid crystal panel 6 to fill a gap between the liquid crystal panel 6 and the front frame 7.

In an LCD 1 shown in FIG. 14, a film 52 is fixed on a rear face of a front frame 7 by using an adhesive double coated tape 51 whose thickness is greater than a gap between a liquid crystal panel 6 and a front frame 7. Then, the film 52 is bent along the liquid crystal panel 6. An inside part 52a of the film 52 contact with a rear face of the front frame 7 and the film 52 fills the gap between the liquid crystal panel 6 and the front frame 7.

Additionally, a patent document 2 (Japanese Patent Application Laid-Open No. 1996-241044) discloses an LCD which includes a solid silicone rubber for preventing invasion of foreign substances.

SUMMARY

An exemplary object of the invention is to provide a display that can obtain a stable effect of prevention on dust invasion.

A display according to an exemplary aspect of the invention includes: a display panel including a display surface; a frame including a cover part which partially faces the display surface; and a film whose fixing area is fixed to the cover part and which is arranged between the display surface and the cover part, and the cover part includes a flat part and a stepped part which projects toward the display surface, and the film comes in contact with the display surface to be bent.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

1. First Exemplary Embodiment

Figure 1:
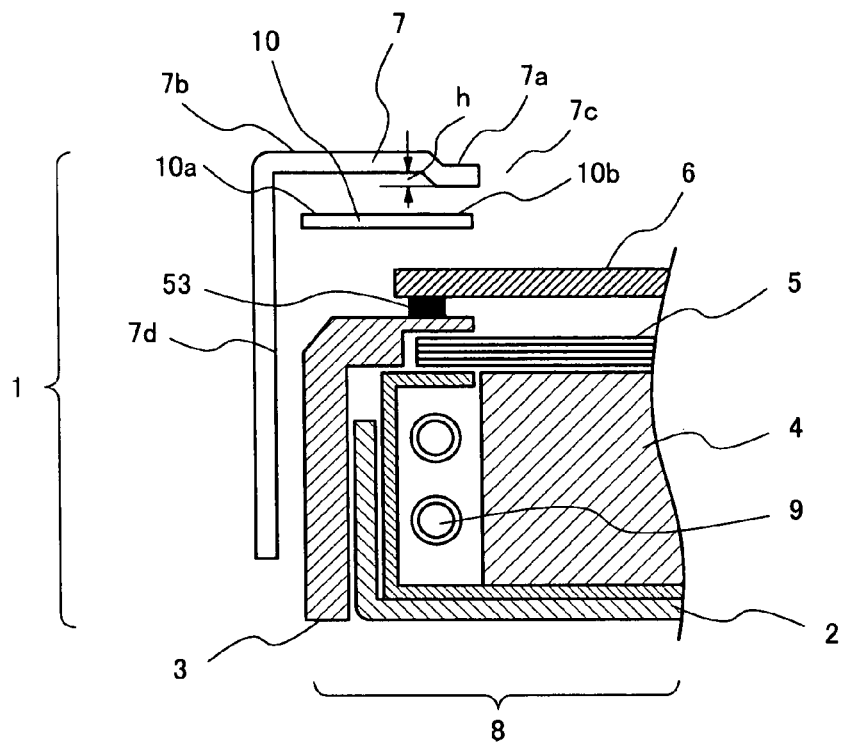
FIG. 1 is an exploded cross sectional view showing a structure of an LCD of a first exemplary embodiment of the present invention.
Figure 2:
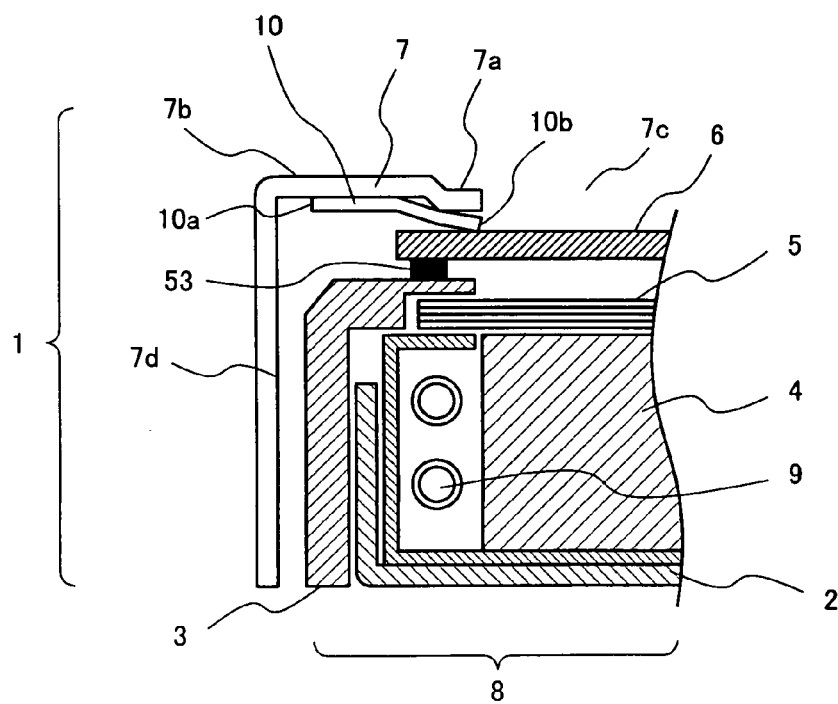
FIG. 2 is a cross sectional view showing an assembled LCD shown in FIG. 1.
Figure 3:
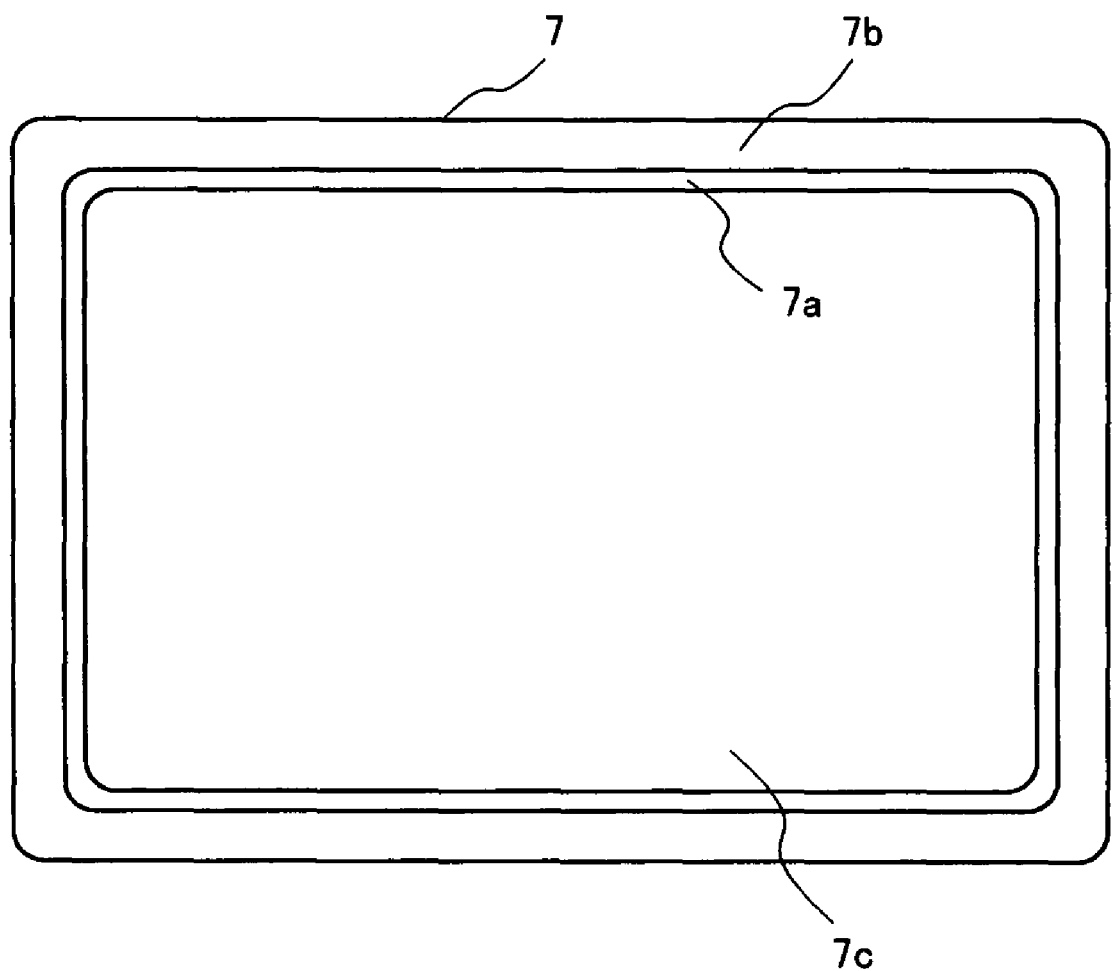
FIG. 3 is a top view showing a structure of a front frame of the first exemplary embodiment of the present invention.
Figure 4A:
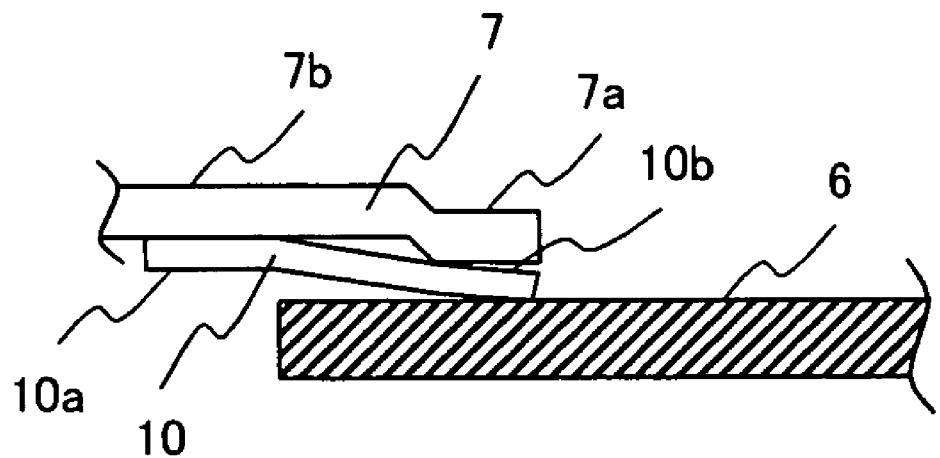
FIGS. 4A and 4B are cross sectional views showing a first and a second example of a part of a display composed of essential components for the present invention.
Figure 4B:
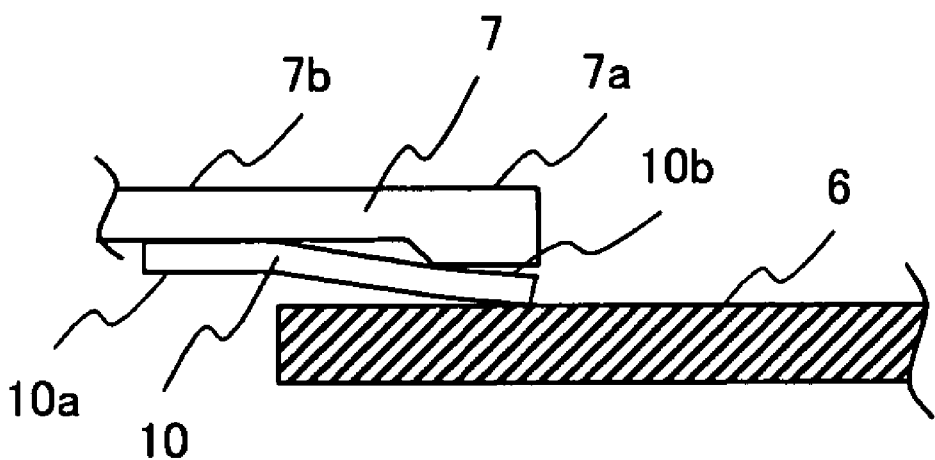
Figure 5A:
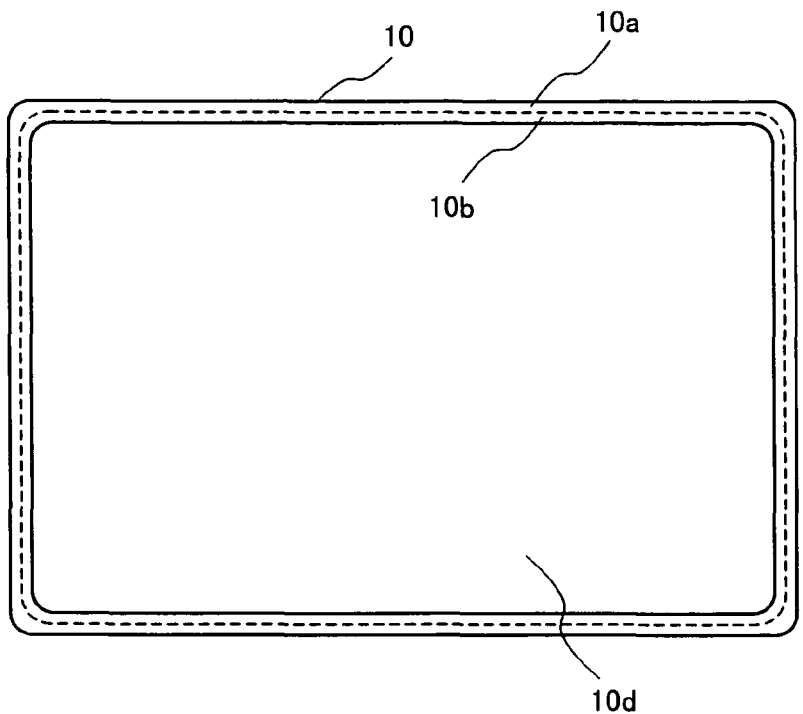
FIGS. 5A to 5D are top views showing a structure of a film of the first exemplary embodiment of the present invention.
Figure 5B:
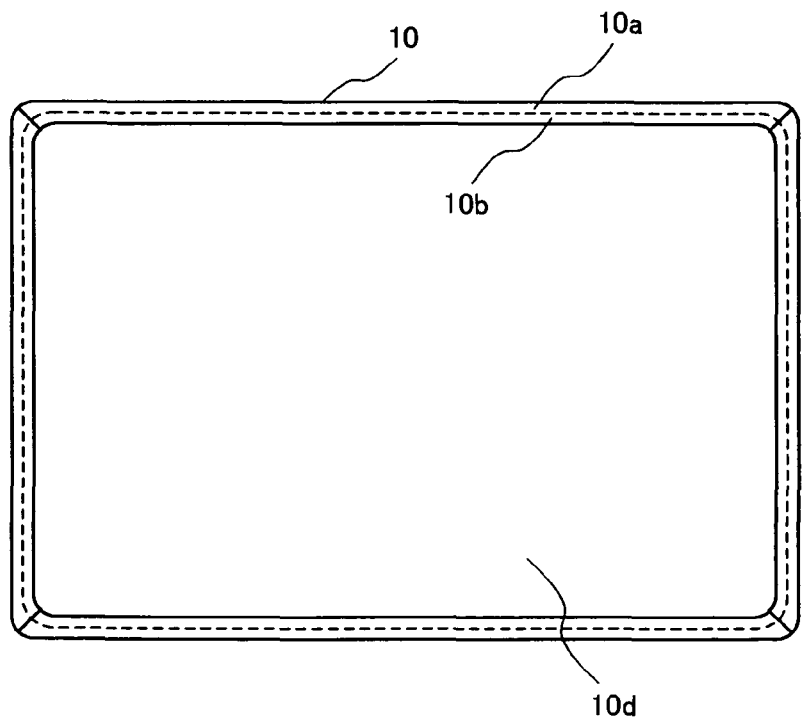
Figure 5C:
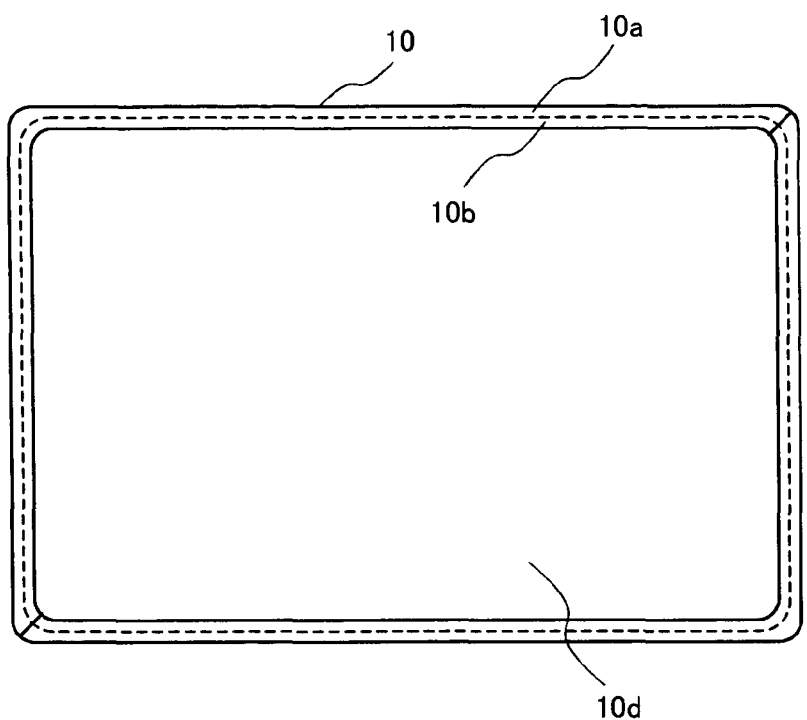
Figure 5D:
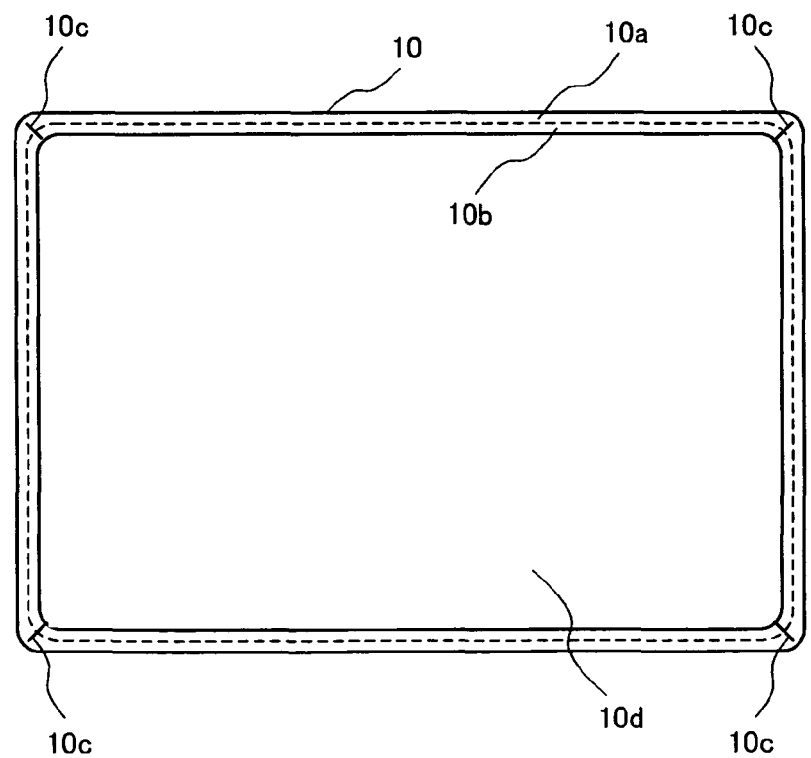
Figure 6:
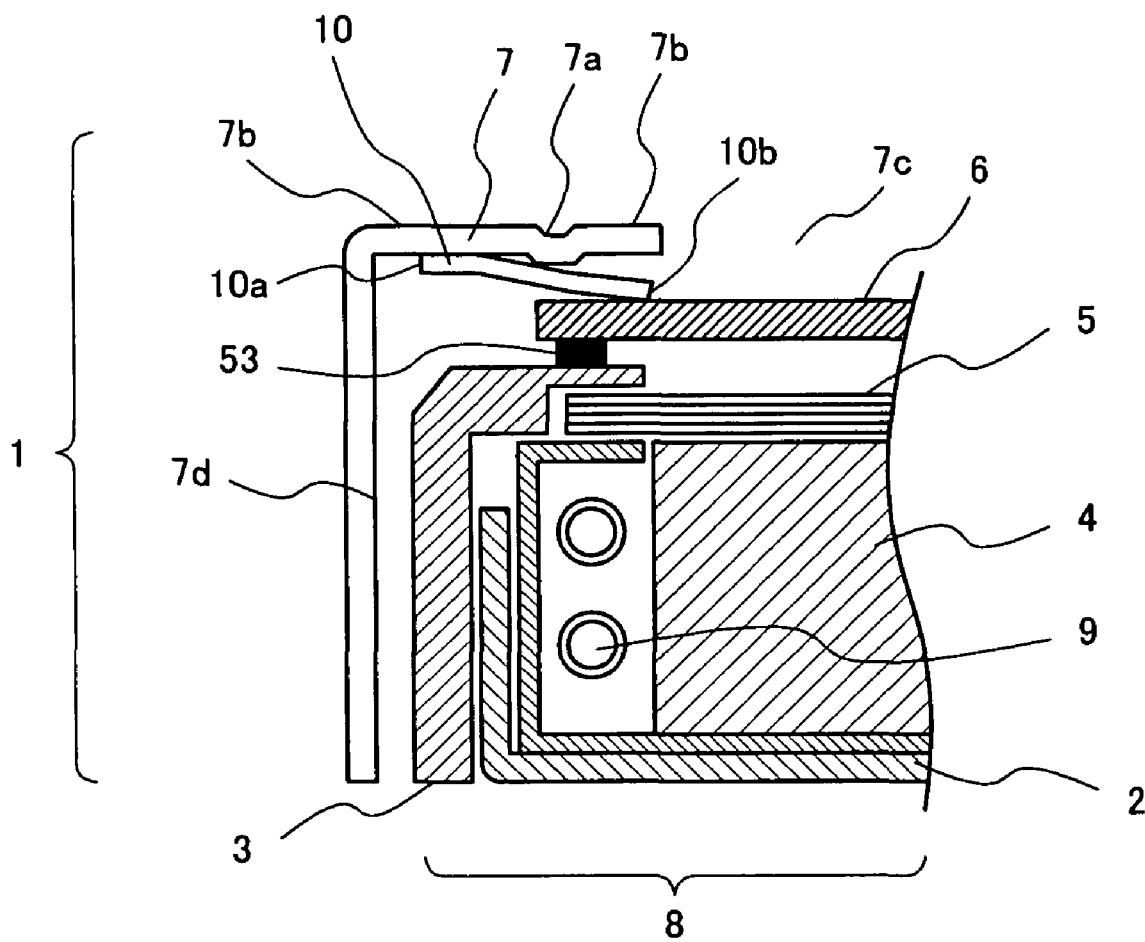
FIG. 6 is a cross sectional view showing another structure of an LCD of the first exemplary embodiment of the present invention.
Figure 7A:
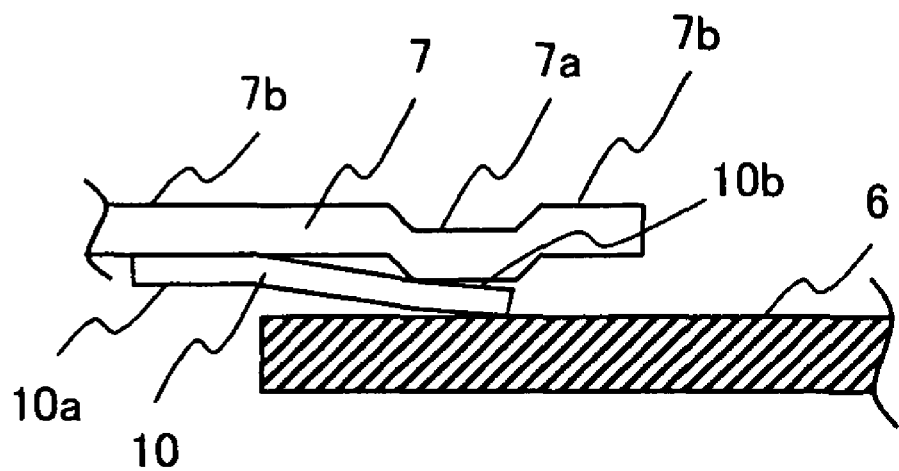
FIGS. 7A and 7B are cross sectional views showing a third and a fourth structure of a display composed of essential components for the present invention.
Figure 7B:
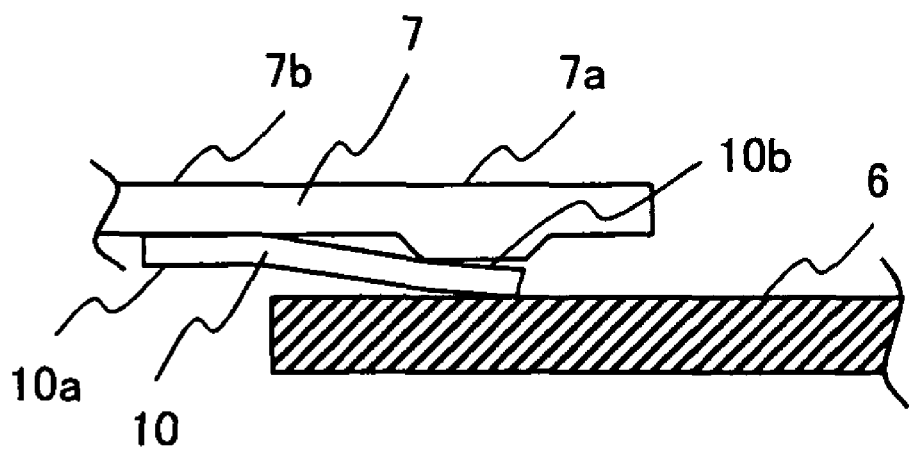
Figure 8A:
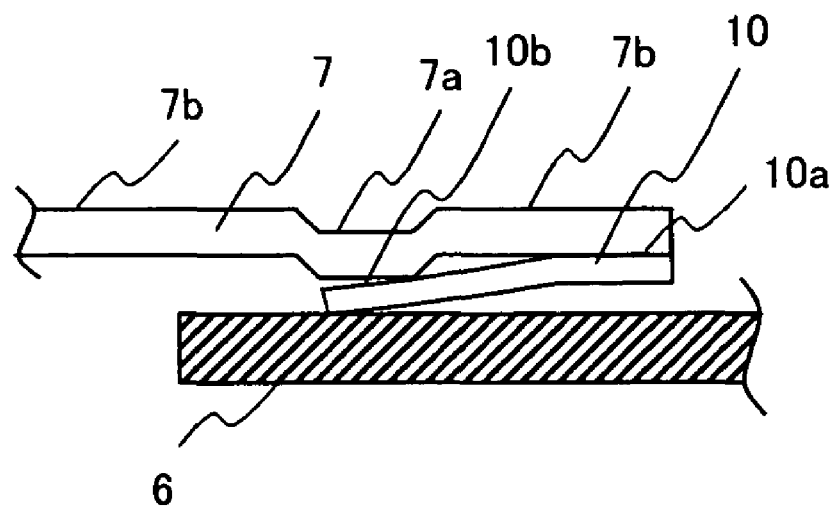
FIGS. 8A and 8B are cross sectional views showing a fifth and a sixth structure of a display composed of essential components for the present invention.
Figure 8B:
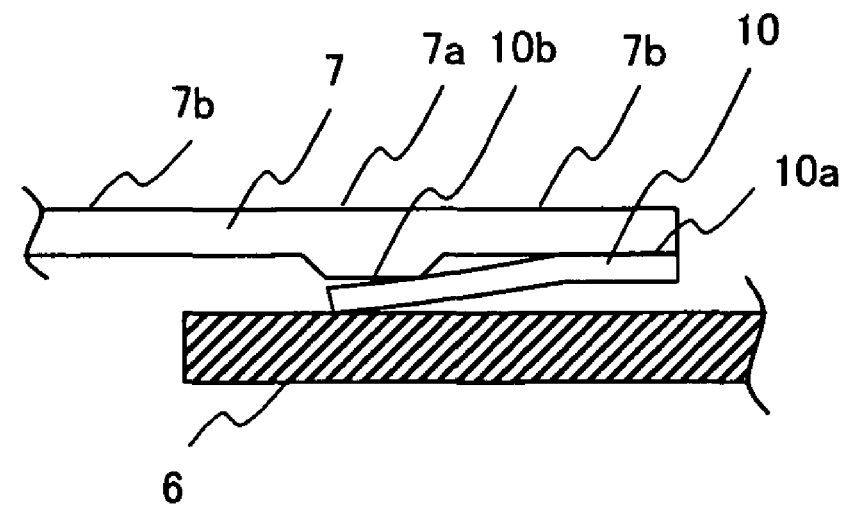

An LCD of the first exemplary embodiment of the present invention will be described with reference to FIGS. 1 to 3, FIGS. 4A and 4B, FIGS. 5A to 5D, FIG. 6, FIGS. 7A and 7B, and FIGS. 8A and 8B. FIG. 1 is an exploded cross sectional view of an LCD of the exemplary embodiment, and FIG. 2 is a cross sectional view showing an assembled LCD shown in FIG. 1. FIG. 3 is a top view showing a structure of a front frame of the exemplary embodiment. FIGS. 5A to 5D are top views showing an example of a structure of a film of the exemplary embodiment. FIG. 6 is a cross sectional view showing another structure of an LCD of the exemplary embodiment. FIGS. 4A and 4B are cross sectional views showing a first and a second example of a display composed of essential components for the present invention. FIGS. 7A and 7B are cross sectional views showing a third and a fourth structure of a display composed of essential components for the present invention. FIGS. 8A and 8B are cross sectional views showing a fifth and a sixth structure of a display composed of essential components for the present invention.

As shown in FIG. 1, an LCD 1 of the exemplary embodiment includes a liquid crystal panel 6, a backlight unit 8, and a case for a display surface (hereinafter, referred to as "front frame 7").

The liquid crystal panel 6 includes a substrate (referred to as "TFT substrate") on which a switching element such as a TFT (thin film transistor) is formed, another substrate (referred to as "CF substrate") on which a color filter, a black matrix and the like are formed, and a liquid crystal sandwiched between the substrates.

The backlight unit 8 includes a light source 9, a light guide plate 4, an optical sheet 5 having an optical function, and a chassis 3 and a rear frame 2 which hold the light guide plate 4 and the optical sheet 5. A CCFL (Cold Cathode Fluorescent Lamp) or the like is used for the light source 9. The light guide plate 4 is formed with a material such as PMMA (Polymethylmethacrylate). FIG. 1 is a view showing the LCD 1 which uses a light emitting system called as a sidelight type in which the light source 9 is arranged at a side area of the light guide plate 4. Any light source and any light emitting system may be used for the backlight unit of the LCD of the exemplary embodiment. The LCD 1 may employ any type of light source, for example, LED (Light Emitting Diode) or the like, and any light emitting system, such as a direct type system.

The liquid crystal panel 6 is fixed on the backlight unit 8 with a buffer material 53 provided on the chassis 3. The front frame 7 covers the liquid crystal panel 6, the chassis 3 of the backlight unit 8. As shown in FIG. 3, an opening 7c of the front frame 7 corresponds to an upper part of the liquid crystal panel 6. The front frame 7 includes a stepped part (i.e. projecting part or convex part) 7a with a height of h which projects toward the display surface of the liquid crystal panel 6. The stepped part 7a is formed along a shape of the opening 7c. A flat and frame-shaped film 10 as shown in FIG. 5A is arranged between the front frame 7 and the liquid crystal panel 6.

As shown in FIG. 2, a fixing part 10a of the film 10 is fixed on a flat part 7b with adhesive or a thin adhesive double coated tape. Therefore, when the front frame 7 and the liquid crystal panel 6 are assembled, an inside part 10b of the film 10 comes in contact with the stepped part 7a to be bent and have contact with the display surface of the liquid crystal panel 6.

The front frame 7 is shaped so that the inside part 10b of the film 10 comes in contact with the display surface of the liquid crystal panel 6 when the front frame 7 and the liquid crystal panel 6 are assembled. In FIG. 1 and FIG. 2, the opening 7c is smaller than an outer shape of the display surface of the liquid crystal panel 6. However, the opening 7c may be larger than an outer shape of a component excluding the display surface, that is, an outer shape of an inner component in the liquid crystal panel 6, only if the opening 7c is smaller than the outer shape of the display surface of the liquid crystal panel 6. For example, the opening 7c may be larger than an outer shape of the CF substrate in an upper surface of the liquid crystal panel 6.

A height h, a width and a shape of the stepped part 7a are not limited to an example shown in FIG. 1, 2 or 3. Any method can be used in order to form the stepped part 7a. In the exemplary embodiment, the stepped part 7a is formed by bending the front frame 7. A frame-shaped member which is fixed on a rear face of the front frame 7 near the opening 7c may be used as the stepped part 7a.

An LCD of the exemplary embodiment is characterized by a structure of the front frame 7, a position to which the film 10 is fixed to within the front frame 7 and a configuration in which the film 10 comes in contact with the liquid crystal panel 6 and the front frame 7. FIGS. 4A and 4B show a configuration of a characteristic portion of the LCD of the exemplary embodiment. The stepped part 7a of the front frame 7 shown in FIG. 4A includes a structure in which a rear face of a part that projects to the liquid crystal panel 6 (a face not facing the liquid crystal panel 6) is concaved. In contrast, with respect to the stepped part 7a shown in FIG. 4B, a rear face of a part that projects to the liquid crystal panel 6 is flat. A method for forming the stepped part 7a by fixing a frame-shaped member is described above. The cross-section of the front frame 7 formed by using this method includes a shape shown in FIG. 4B. Thus, a rear face of the stepped part 7a may be flat.

The film 10 needs to be arranged in a route through which a dust deteriorating display quality invades a screen display area. The route of dust invasion is a path from an outside of the LCD 1 to an inside of the LCD 1 through a gap between the liquid crystal panel 6 and the front frame 7. Accordingly, a shape of the film 10 is not limited to the frame-shaped form shown in FIG. 5A. For example, the film 10 may include a configuration in which four belt-shaped films are combined as shown in FIG. 5B or a configuration in which two L-shaped films are combined as shown in FIG. 5C. Additionally, the film 10 may include a configuration in which a square U-shaped film and a belt-shaped film are combined. A width of the film 10 shown in FIG. 5A is constant. The width of the film 10 may be partially wide or narrow. Furthermore, as shown in FIG. 5D, the film 10 may include a slit 10c at each corner part thereof so that the film 10 uniformly transforms over an entire shape thereof. An outer part of the film 10 may come in contact with an inner surface 7d of the front frame 7. It is desirable that an inside part 10b of the film 10 is formed not to protrude into the opening 7c of the front frame 7.

A material of the film 10 needs to be a transformable material. For example, plastics such as PET (polyethylene terephthalate) can be used. The film 10 composed of a flexible material can certainly contact with the liquid crystal panel 6. In order to reduce a load which the film 10 applies to the liquid crystal panel 6 when the film 10 comes in contact with the liquid crystal panel 6, it is desirable that the film 10 is set to be about 25 μm to 100 μm in thickness. Furthermore, it is desirable that a location in the liquid crystal panel 6 to which the film 10 applies a load is set to only the stepped part 7a. Accordingly, it is desirable that the thickness of the film 10 including the thickness of an adhesive is smaller than a distance between the flat part 7b and the liquid crystal panel when the liquid crystal panel 6 and the front frame 7 are assembled. An amount of a light transmitting through the film 10 is large, when the thickness of a film material is less than 25 μm. Thus, a light leakage preventing power is degraded. Because a stiffness of the film 10 is low, distortion or wrinkle easily occurs and shape stability is degraded. As described above, a minimum thickness needs to be about 25 μm. Any color of the film 10 is available. In order to secure light shielding or make the film 10 less noticeable, a black or gray film may be desirably selected.

In the above-mentioned exemplary embodiment, the stepped part 7a is formed along the shape of opening 7c of the front frame 7. When the stepped part 7a is formed at a position that is closer to the opening 7c than a position of the front frame 7 on which the film 10 is fixed, the same effect as that of the above-mentioned exemplary embodiment can be obtained. For example, as shown in FIG. 6, the stepped part 7a may be provided on the front frame 7 apart from the opening 7c (i.e. on the front frame 7 close to surface 7d thereof). That is, the front frame 7 shown in FIG. 6 includes the flat part 7b inside the stepped part 7a. A relative positional relationship among the front frame 7, the film 10 and the liquid crystal panel 6 in the LCD 1 shown in FIG. 6 is the same as that of the LCD 1 shown in FIG. 2.

FIGS. 7A and 7B show a characteristic portion of the LCD of the exemplary embodiment. The display shown in FIGS.

7A and 7B differs from a display shown in FIGS. 4A and 4B with respect to a location of the stepped part 7a. The stepped part 7a shown in FIGS. 7A and 7B is provided on the front frame 7 apart from the opening 7c (i.e. on the front frame 7 close to the inner surface 7d thereof). The stepped part 7a shown in FIG. 7A includes a structure in which a rear face of a part that projects to the liquid crystal panel 6 is concaved. In contrast, a rear face of a part that projects to the liquid crystal panel 6 is flat with respect to the stepped part 7a of the front frame 7 shown in FIG. 7B.

As shown in FIGS. 8A and 8B, the fixing part 10a may be arranged in the flat part 7b that is closer to the opening 7c than the stepped part 7a. That is, the fixing part 10a is arranged in the flat part 7b inside the stepped part 7a on the front frame 7 shown in FIGS. 8A and 8B. A relative positional relationship among the front frame 7, the film 10, and the liquid crystal panel 6 is the same as that of an LCD shown in FIGS. 7A and 7B.

In the LCD 1 of the exemplary embodiment, the film 10 is inserted between the front frame 7 and the liquid crystal panel 6. The stepped part 7a that projects toward a display surface of the liquid crystal panel 6 is provided on the front frame 7. By bending the front frame 7, the stepped part 7a is formed with high accuracy. Accordingly, the film 10 certainly comes in contact with the liquid crystal panel 6, and variation of a load applied to the liquid crystal panel 6 is decreased. Since the film 10 is fixed to the front frame 7, a gap between the front frame 7 and the liquid crystal panel 6 is filled by the film 10. Thus, the LCD 1 of the exemplary embodiment prevents deterioration of display quality and furthermore can effectively prevent dust invasion and light leakage. Additionally, in the LCD 1 of the exemplary embodiment, because bending the film 10 is not required, production cost of the film 10 is reduced.

2. Second Exemplary Embodiment

Figure 9:
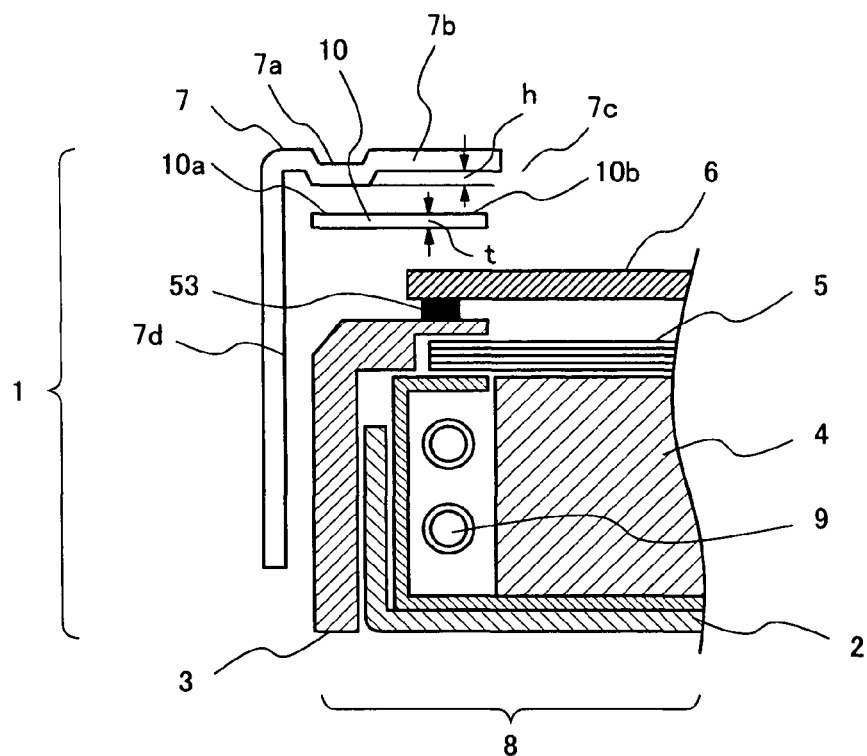
FIG. 9 is an exploded cross sectional view showing a structure of an LCD of a second exemplary embodiment of the present invention.
Figure 10:
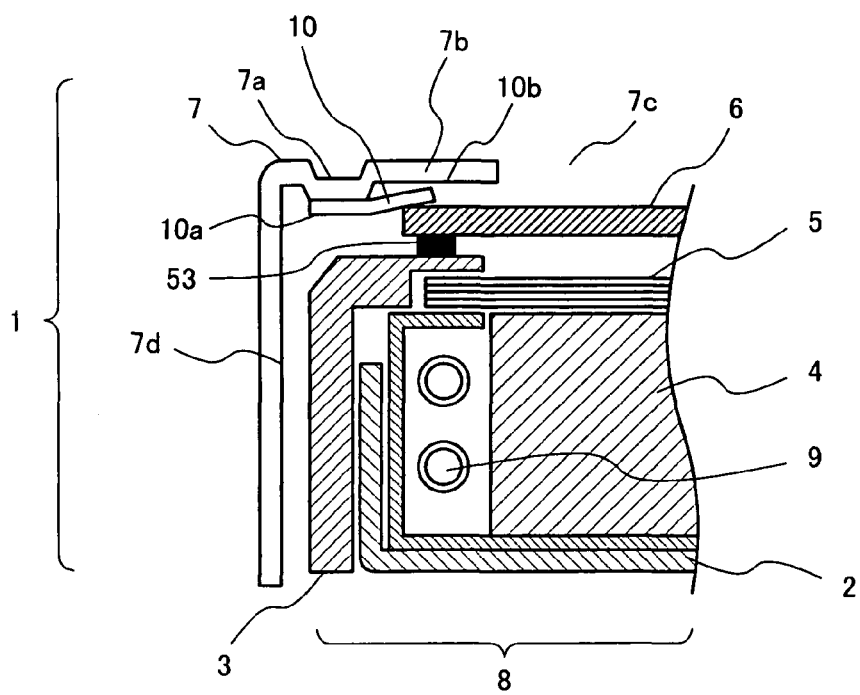
FIG. 10 is a cross sectional view showing an assembled LCD shown in FIG. 9.
Figure 11A:
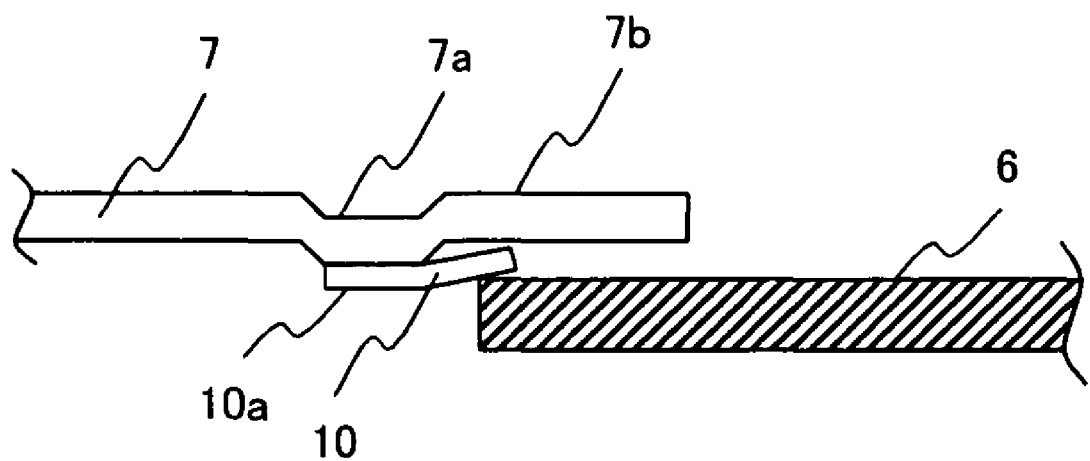
FIGS. 11A and 11B are cross sectional views showing a seventh and an eighth structures of a display composed of essential components for the present invention.
Figure 11B:
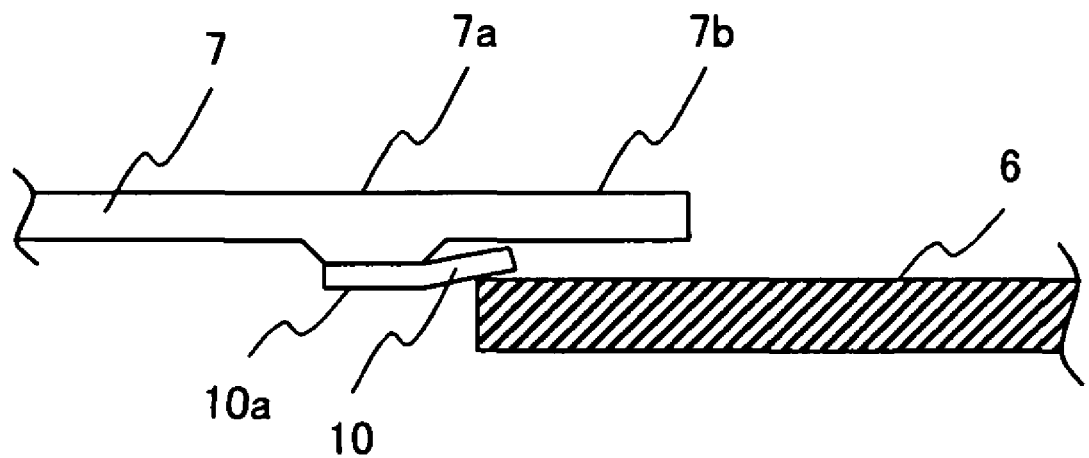

An LCD of the second exemplary embodiment of the present invention will be described with reference to FIG. 9, FIG. 10, and FIGS. 11A, 11B. FIG. 9 is an exploded cross sectional view of an LCD of the exemplary embodiment, and FIG. 10 is a cross sectional view showing an assembled LCD shown in FIG. 9. FIGS. 11A and 11B are cross sectional views showing a seventh and an eighth structural example of a display composed of essential components for the present invention, respectively.

In an LCD of the first exemplary embodiment, the stepped part 7a is provided to the front frame 7, and the stepped part 7a bends the inside part 10b of the film 10. In a display of the present invention, a film fixed to a front frame has only to come in contact with a display panel, or to come in contact with a display panel and then be transformed.

For example, as shown in FIGS. 9 and 10, in the LCD 1, the stepped part 7a provided on the front frame 7 may be located in an area outside the liquid crystal panel 6 (i.e. an area within the front frame 7 where the stepped part 7a does not face the liquid crystal panel 6). The stepped part 7a includes a flat face for fixing the film 10. The fixing part 10a of the film 10 is fixed to the flat face in the stepped part 7a by an adhesive double coated tape or an adhesive. At that time, as shown in FIG. 10, a sum of a height h of the stepped part 7a and the thickness t of the film 10 is set to be a value larger than a distance between the flat part 7b and the liquid crystal panel 6 when the front frame 7 and the liquid crystal panel 6 are assembled. And the thickness of the film 10 is set to a value which is smaller than the distance between the flat part 7b and the liquid crystal panel 6. Thereby, as shown in FIG. 10, a part located inside the fixing part 10a of the film 10 comes in contact with an edge part of the liquid crystal panel 6 when the front frame 7 and others are assembled. Accordingly, the LCD of the second exemplary embodiment shown in FIG. 9 and FIG. 10 includes the same effect as that of the first exemplary embodiment.

FIGS. 11A and 11B are views showing a structure of a characteristic portion of the LCD of the exemplary embodiment. The stepped part 7a of the front frame 7 shown in FIG. 11A includes a structure in which a rear face (a face not facing the liquid crystal panel 6) of the stepped part 7a is concaved. In contrast, a rear face of the stepped part 7a of the front frame 7 shown in FIG. 11B is flat. As shown in FIGS. 11A and 11B, the thickness t of the film 10 is set to a value which is smaller than a distance between the flat part 7b and the liquid crystal panel 6 when the front frame 7 and the liquid crystal panel 6 are assembled.

3. Third Exemplary Embodiment

Figure 12A:
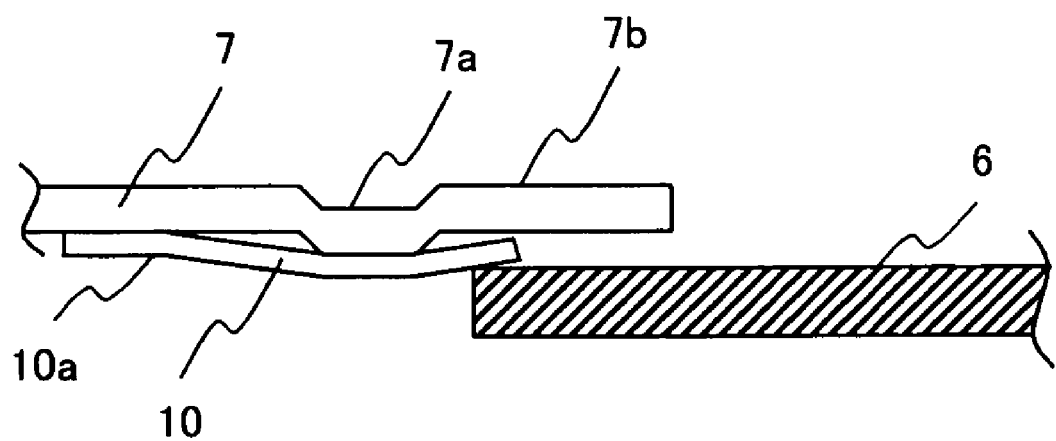
FIGS. 12A and 12B are cross sectional views showing a ninth and a tenth structures of a display composed of essential components for the present invention.
Figure 12B:
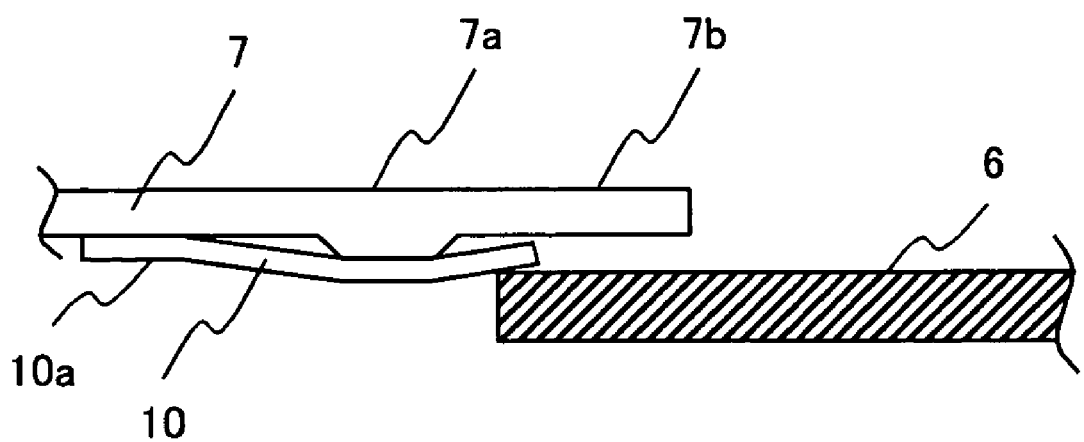

A display of the third exemplary embodiment of the present invention will be described with reference to FIGS. 12A, and 12B. FIGS. 12A and 12B are cross sectional views showing a ninth and a tenth structural example of a display composed of essential components for the present invention, respectively.

As shown in FIGS. 12A and 12B, the fixing part 10a may be fixed to a part outside the stepped part 7a of the front frame 7 (i.e. to a part far from a liquid crystal panel 6). The thickness of the film 10 is set to a value which is smaller than a distance between the flat part 7b and the liquid crystal panel 6 when the front frame 7 and the liquid crystal panel 6 are assembled. In this case, the film 10 comes in contact with the liquid crystal panel 6 to be bent thereby, and the film 10 has contact with the stepped part 7a. However, the film 10 is not fixed on the stepped part 7a. With respect to this point, a structure of the third exemplary embodiment is different from a structure of the second exemplary embodiment. Additionally, the film 10 is not sandwiched between the stepped part 7a and the liquid crystal panel 6. With respect to this point, a structure of the third exemplary embodiment is different from a structure of the first exemplary embodiment.

As mentioned above, in a display of the third exemplary embodiment, a film comes in contact with an edge part of the liquid crystal panel 6. Therefore, the display has the same effect as that of the first and the second exemplary embodiments.

In a structure of each above-mentioned exemplary embodiment, the film 10 is fixed on a rear face of the front frame 7 that faces the liquid crystal panel 6 along all sides of the rectangular liquid crystal panel 6. A structure of the present invention is not limited to that of the above-mentioned exemplary embodiment, and only a part on which dust invasion and/or light leakage is likely to occurs may be filled (e.g. only a particular part of any one side among all sides of the liquid crystal panel 6).

The present invention is characterized by the front frame 7 and the film 10. A structure and/or a shape of other members are not limited. Any drive system can be used for a liquid crystal panel. For example, an IPS (In Plane Switching) system, a TN (Twisted Nematic) system or a VA (Vertical Alignment) system can be used. Any type and any structure can be used for a switching element. A positive stagger type or a reverse stagger type can be used.

A display panel used for a display of the present invention is not limited to a liquid crystal panel. The present invention can also be applied to a display panel other than a liquid crystal panel. For example, the invention can be applied to a display panel such as a CRT (Cathode-ray tube), a plasma display and an organic EL (electroluminescence) display. By applying the present invention, a dust invasion prevention effect can be obtained for any type of display panel. In a display using a backlight, a light leakage prevention effect can be obtained. In an LCD in which display quality is deteriorated due to a load applied to a display surface, deterioration of display quality can be prevented.

The present invention can be also used for any apparatus having a display panel in which a gap between a member such as a display panel and a chassis such as a front frame has to be filled without applying an excessive load to a display surface.

Figure 13:
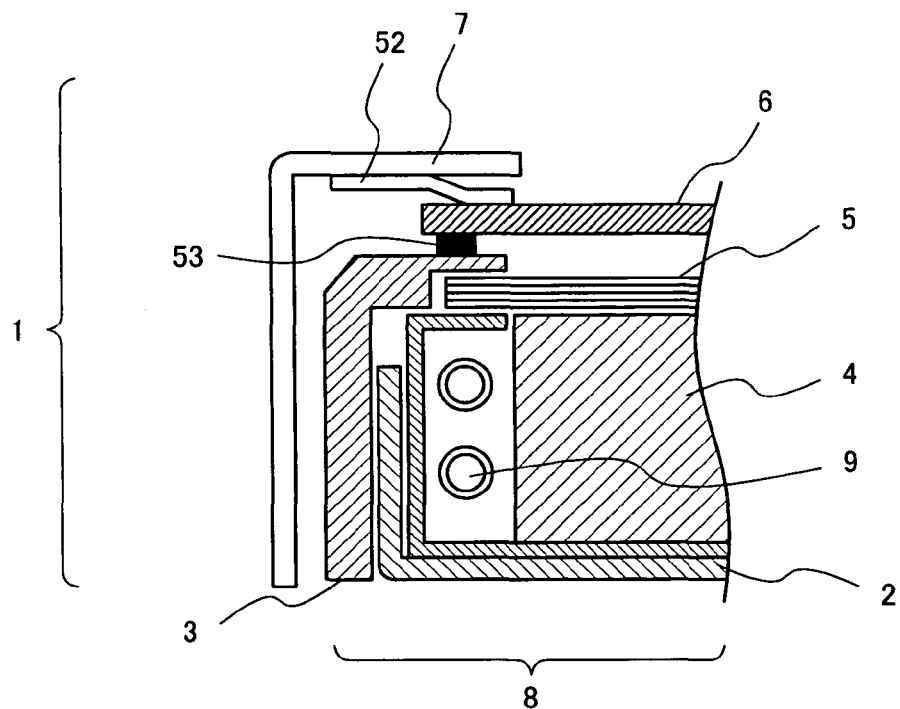
FIGS. 13 and 14 are cross sectional views showing a structure of an LCD described in a patent document.

In an LCD described in the patent document 1 shown in FIG. 13, the film 52 is bent. Therefore, a bending process for the film 52 increases a production cost of the film 52. It is difficult to control a bending angle in a bending process for a thin film. Further, a bending angle of a film may easily vary. Therefore, when a bending angle is large beyond necessity, a load to the liquid crystal panel 6 is increased. Thus, display quality may be deteriorated. When a bending angle is small, the inside part 52a of the film 52 does not come in contact with the liquid crystal panel 6. Accordingly, a dust invasion prevention/light leakage prevention effect is decreased.

Figure 14:
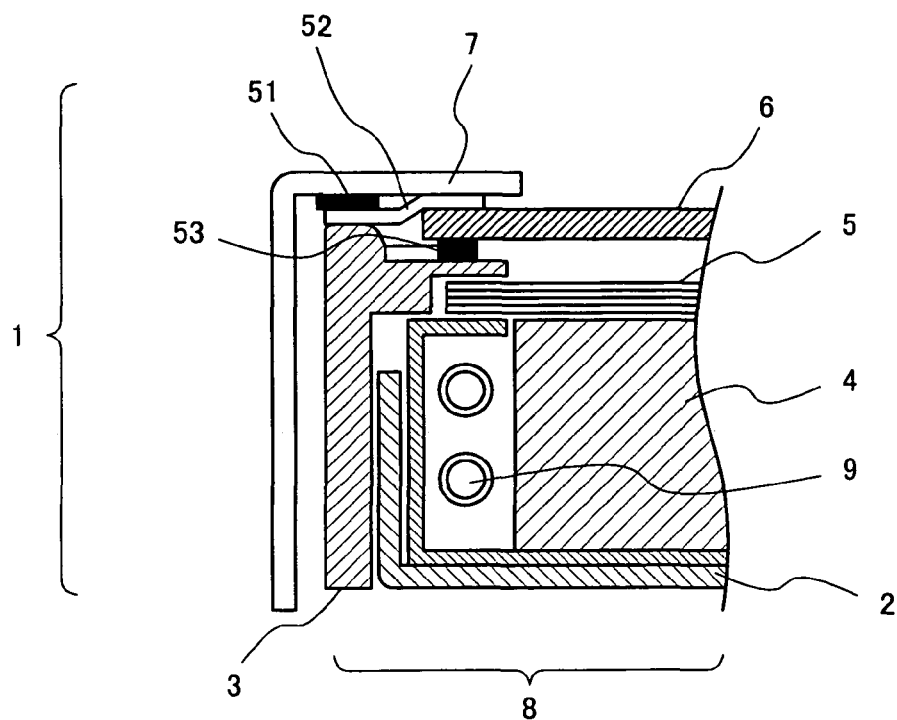

In an LCD described in the patent document 1 shown in FIG. 14, an adhesive double coated tape 51 whose thickness is larger than a gap between the liquid crystal panel 6 and the front frame 7 is used. Therefore, by using the tape 51, a cost for fixing the film 52 increases. The thickness of the tape 51 easily varies due to a manufacturing condition, an ambient environment, a load by a vibration and aging of the tape 51. Therefore, when the thickness of the tape 51 is thick more than necessary, the film 52 applies a large load to the liquid crystal panel 6 to decrease display quality. On the contrary, when a sum of the thickness of the tape 51 and the thickness of the film 52 is smaller than a distance between the liquid crystal panel 6 and the front frame 7, the film 52 does not come in contact with the liquid crystal panel 6. Thus, dust invasion prevention effect and light leakage prevention effect are deteriorated.

In an LCD disclosed in the patent document 1, a gap between the front frame and the liquid crystal panel is filled with a film. In the LCD, the film is bent, or the film is fixed on the front frame with a thick adhesive double coated tape. However, the above-mentioned LCD cannot sufficiently prevent deterioration of display quality due to a load to the liquid crystal panel. The LCD does not includes stable dust invasion prevention effect and/or light leakage prevention effect. A bending process for a film and an adhesive double coated tape increase a cost of the LCD.

In a structure of the first exemplary embodiment (FIGS. 1 to 3, FIGS. 4A, 4B, 6, 7A, 7B, 8A and 8B) and a structure of the third exemplary embodiment (FIGS. 13A, 13B, 14A and 14B), a bending angle of the film 10 is adjusted with the fixing part 10a of the film and a shape of the stepped part 7a of the front frame 7. Therefore, it is not necessary to apply a bending process which needs a difficult control of a bending angle to the film 10 like it is in the patent document 1. Therefore, a bending angle of the film 10 is kept constant, and a load which the film 10 applies to the liquid crystal panel 6 does not vary. Thereby, deterioration of display quality can be prevented and also a dust invasion prevention and light leakage prevention effect can be stably obtained. Additionally, because a bending process for the film 10 is not required, a cost of the film 10 can be reduced.

In a structure of the second exemplary embodiment (FIGS. 9, 10, 11A, 11B, 12A and 12B), after fixing the film 10 on the stepped part 7a of the front frame 7, the liquid crystal panel 6 and the front frame 7 are assembled and the film 10 comes in contact with the liquid crystal panel 6. At that time, the film 10 is not fixed by using the adhesive double coated tape 51 like the structure described in the patent document 1. Therefore, a problem which occurs when the thickness of the tape 51 is larger than a distance between the liquid crystal panel 6 and the front frame 7 and a problem due to a manufacturing condition, an ambient environment, a vibration load or aging of material do not occur. Accordingly, a positional relationship between the liquid crystal panel 6 and the film 10 is stable, a variation of a load which the film 10 applies to the liquid crystal panel 6 is decreased, and deterioration of display quality can be prevented. Furthermore, a dust invasion prevention effect and light leakage prevention effect can be stably obtained. Because the tape 51 whose thickness is larger than a distance between the liquid crystal panel 6 and the front frame 7 is not required, a cost for fixing the film 10 can be reduced.

Further, an LCD using a solid silicone rubber is disclosed in the patent document 2. In the LCD, the thickness of an LCD is large by an amount of thickness of the solid silicone rubber fixed between a shield case and an LCD panel. When fixing the solid silicone rubber between the shield case and the LCD panel, a predetermined gap has to be set between the solid silicone rubber and the LCD panel so as not to influence display quality of the LCD panel. However, even if hardness of the solid silicone rubber is decreased, display quality is deteriorated when the solid silicone rubber comes in contact with an LCD panel.

In contrast, in a display of the present invention, a gap between the front frame 7 and the liquid crystal panel 6 is larger than the thickness of the film 10, and constant so that the film 10 comes in contact with the liquid crystal panel 6 when the front frame 7 and the liquid crystal panel 6 are assembled. The film 10 of a thin type which does not affect display quality of the liquid crystal panel 6 when the film 10 comes in contact with the liquid crystal panel 6 is provided in the gap. Because it is not necessary to increase the thickness of the LCD by an amount of thickness of the solid silicone rubber, a display of the present invention can be made thin.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:
1. A display comprising:
a display panel including a display surface;
a frame including a cover part which partially faces the display surface; and
a film whose fixing area is fixed to the cover part and which is arranged between the display surface and the cover part,
wherein the cover part includes a flat part and a stepped part which projects toward the display surface, and the stepped part comprises a bent portion of the frame, and
wherein the film is fixed to the flat part and comes in contact with the stepped part and the display surface so as to be bent at an angle.

2. The display according to claim 1, wherein a thickness of the film is less than a distance between the stepped part and the display surface.

3. The display according to claim 1, wherein the fixing area is fixed to the stepped part,
wherein a distance between the flat part and the display surface is less than a sum of a height of the stepped part and a thickness of the film, and
wherein the film comes in contact with the display surface so as to be bent thereby between the flat part and the display surface.

4. The display according to claim 3, wherein the thickness of the film is less than the distance between the flat part and the display surface.

5. The display according to claim 1, wherein the fixing area is fixed to the flat part,
wherein a distance between the flat part and the display surface is less than a sum of a height of the stepped part and a thickness of the film, and
wherein the film comes in contact with the display surface so as to be bent thereby between the flat part excluding an area to which the fixing area is fixed and the display surface.

6. The display according to claim 5, wherein the thickness of the film is less than the distance between the flat part and the display surface.

7. The display according to claim 1, wherein the cover part includes an opening,
wherein an area around the opening faces a frame-shaped area with a predetermined width which is an edge part of the display surface, and
wherein the stepped part is located in a whole area of the area around the opening.

8. The display according to claim 1, wherein the cover part includes an opening,
wherein an area around the opening faces a frame-shaped area with a predetermined width which is an edge part of the display surface,
wherein a first flat part is located in a whole area of the area around the opening, and
wherein the stepped part is located so as to surround the first flat part.

9. The display according to claim 8, wherein the film comes in contact with the display surface so as to be bent thereby and comes in contact with the stepped part.

10. The display according to claim 8, wherein a second flat part is located so as to surround the stepped part and
wherein the fixing area is fixed to the second flat part.

11. The display according to claim 8, wherein the fixing area is fixed to the first flat part.

12. The display according to claim 1, wherein the cover part includes an opening,
wherein an area around the opening faces a frame-shaped area with a predetermined width which is an edge part of the display surface, a first flat part is located in a whole area of the area around the opening,
wherein the stepped part is located so as to surround the first flat part, and
wherein the film comes in contact with the display surface so as to be bent thereby between the first flat part and the display surface.

13. The display according to claim 1, wherein the cover part includes an opening,
wherein an area around the opening faces a frame-shaped area with a predetermined width which is an edge part of the display surface,
wherein a first flat part is located in a whole area of the area around the opening,
wherein the stepped part is located so as to surround the first flat part,
wherein a second flat part is located so as to surround the stepped part,
wherein the fixing area is fixed to the second flat part, and
wherein the film comes in contact with the stepped part, and comes in contact with the display surface between the first flat part and the display surface.

14. The display according to claim 1, wherein the film comprises a flexible material.

15. The display according to claim 1, wherein a thickness of the film is in a range of 25 μm to 100 μm.

16. The display according to claim 1, wherein the film blocks a part of or all of a light from entering the film.

17. The display according to claim 1, wherein the stepped part is integrally formed with the cover part.

18. The display according to claim 1, wherein the film is formed so as to comprise a flat shape in an absence of elastic deformation of the film.

19. The display according to claim 1, wherein the film is fixed to a portion of the cover part other than the stepped part.

20. The display according to claim 1, wherein the fixing area of the film is fixed on the flat part with adhesive or a thin adhesive double coated tape, and
wherein the stepped part and the cover part comprise a same material.

21. A display, comprising:
a display panel including a display surface;
a frame including a cover part which partially faces the display surface; and
a film whose fixing area is fixed to the cover part and which is arranged between the display surface and the cover part,
wherein the cover part includes a flat part and a stepped part which projects toward the display surface, and the stepped part comprises a bent portion of the frame, and
wherein the film is fixed to the flat part and comes in contact with the stepped part and the display surface so as to be bent at an angle,
wherein the film is fixed to the frame by an adhesive.

* * * * *